(12) United States Patent
Rush et al.

(10) Patent No.: US 11,379,942 B2
(45) Date of Patent: Jul. 5, 2022

(54) COMPUTATIONAL SENSOR

(71) Applicant: Advanced Micro Devices, Inc., Santa Clara, CA (US)

(72) Inventors: Allen H. Rush, Santa Clara, CA (US); Hui Zhou, Shanghai (CN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/832,734

(22) Filed: Dec. 5, 2017

(65) Prior Publication Data
US 2019/0164251 A1 May 30, 2019

(30) Foreign Application Priority Data
Nov. 29, 2017 (CN) .......................... 201711230019.5

(51) Int. Cl.
| | | |
|---|---|---|
| *G06T 1/20* | (2006.01) | |
| *G06T 5/00* | (2006.01) | |
| *H04N 5/235* | (2006.01) | |
| *G06T 5/20* | (2006.01) | |
| *H04N 5/347* | (2011.01) | |

(52) U.S. Cl.
CPC ................ *G06T 1/20* (2013.01); *G06T 5/007* (2013.01); *G06T 5/20* (2013.01); *H04N 5/2353* (2013.01); *H04N 5/347* (2013.01); *G06T 2210/22* (2013.01); *G06T 2210/52* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,792,694 A | * | 12/1988 | Shioya ................ | H04N 13/243 250/558 |
| 8,521,022 B1 | * | 8/2013 | Sriram ................ | H04J 14/0257 398/57 |
| 10,169,864 B1 | * | 1/2019 | Bagherinia ............ | G06T 7/143 |
| 10,295,838 B1 | * | 5/2019 | Arbore ................ | G01N 21/8806 |
| 2009/0174786 A1 | * | 7/2009 | Joseph ................ | H04N 5/232 348/222.1 |
| 2010/0097493 A1 | * | 4/2010 | Asoma ................ | H04N 5/235 348/229.1 |
| 2013/0155474 A1 | * | 6/2013 | Roach ................ | G06Q 20/322 358/505 |
| 2013/0201355 A1 | * | 8/2013 | Seki ................ | H04N 5/23212 348/207.1 |
| 2018/0007333 A1 | * | 1/2018 | Lim ................ | H04N 9/67 |
| 2018/0017491 A1 | * | 1/2018 | Arbore ................ | G01N 21/59 |
| 2018/0115776 A1 | * | 4/2018 | Holcomb ............ | H04N 19/186 |
| 2018/0218710 A1 | * | 8/2018 | Park ................ | G09G 5/00 |

* cited by examiner

*Primary Examiner* — Zhiyu Lu
(74) *Attorney, Agent, or Firm* — Volpe Koenig

(57) ABSTRACT

A system and method for controlling characteristics of collected image data are disclosed. The system and method include performing pre-processing of an image using GPUs, configuring an optic based on the pre-processing, the configuring being designed to account for features of the pre-processed image, acquiring an image using the configured optic, processing the acquired image using GPUs, and determining if the processed acquired image accounts for feature of the pre-processed image, and the determination is affirmative, outputting the image, wherein if the determination is negative repeating the configuring of the optic and re-acquiring the image.

20 Claims, 18 Drawing Sheets

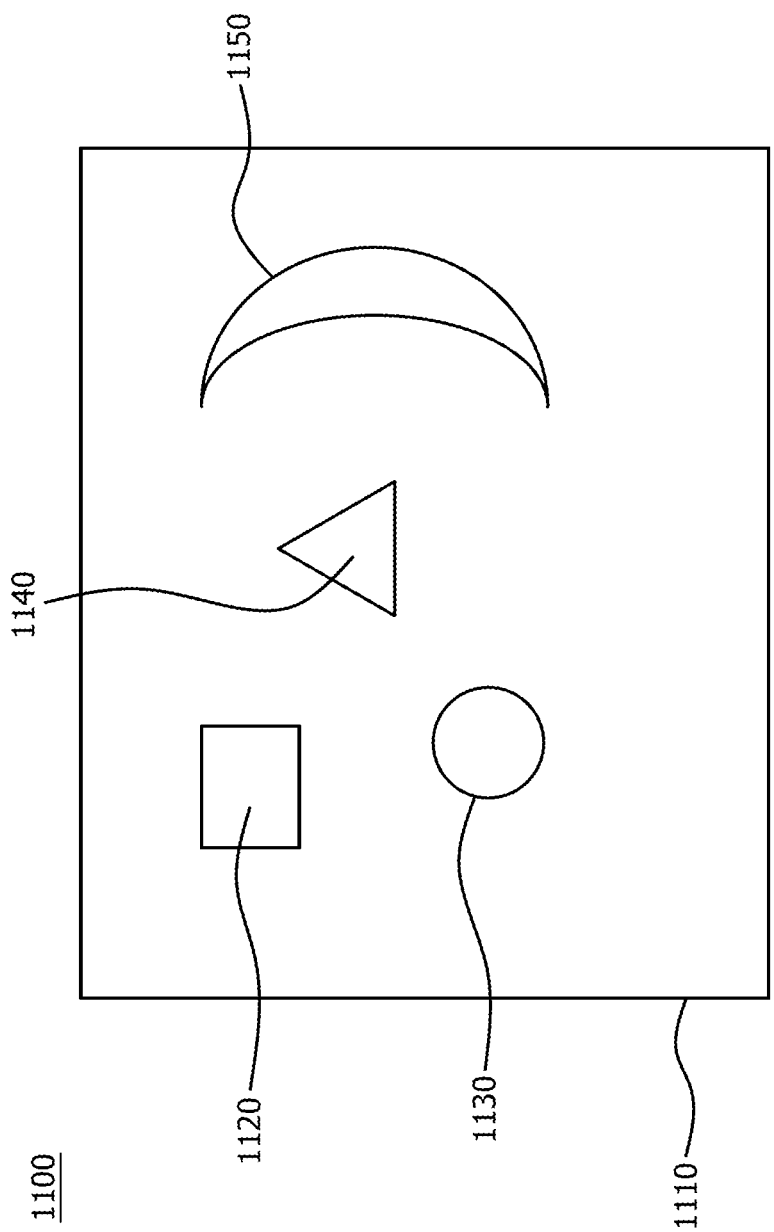

1300

1600

COMPUTATIONAL SENSOR

CROSS REFERENCE TO RELATED APPLICATION

This application claims priority to Chinese Patent Application No. 201711230019.5, filed Nov. 29, 2017, the entire contents of which is hereby incorporated by reference as if fully set forth herein.

BACKGROUND

Early processing of raw sensor data enables either more precise (lower noise) handling of image data or more efficient management of image data for computer vision applications (detection, tracking, etc.). However, a need exists to enable efficient processing efficiency and use of advanced algorithms with respect to captured data and capturing data with high dynamic range even with limited well-structure pixels/sensors by fine control of exposure dynamics.

BRIEF DESCRIPTION OF THE DRAWINGS

A more detailed understanding can be had from the following description, given by way of example in conjunction with the accompanying drawings wherein:

FIG. 11 illustrates an example of controlling preprocess using region of interest (ROI);

DETAILED DESCRIPTION

Integrating a grid of processing elements with an array of focal plane elements that are typically present in an image sensor is described. In particular, each focal plane element can be treated as a "local element" to a processing element and be scheduled and managed accordingly. This provides earlier access to the captured data and finer control of the focal plane element.

Figure 1:
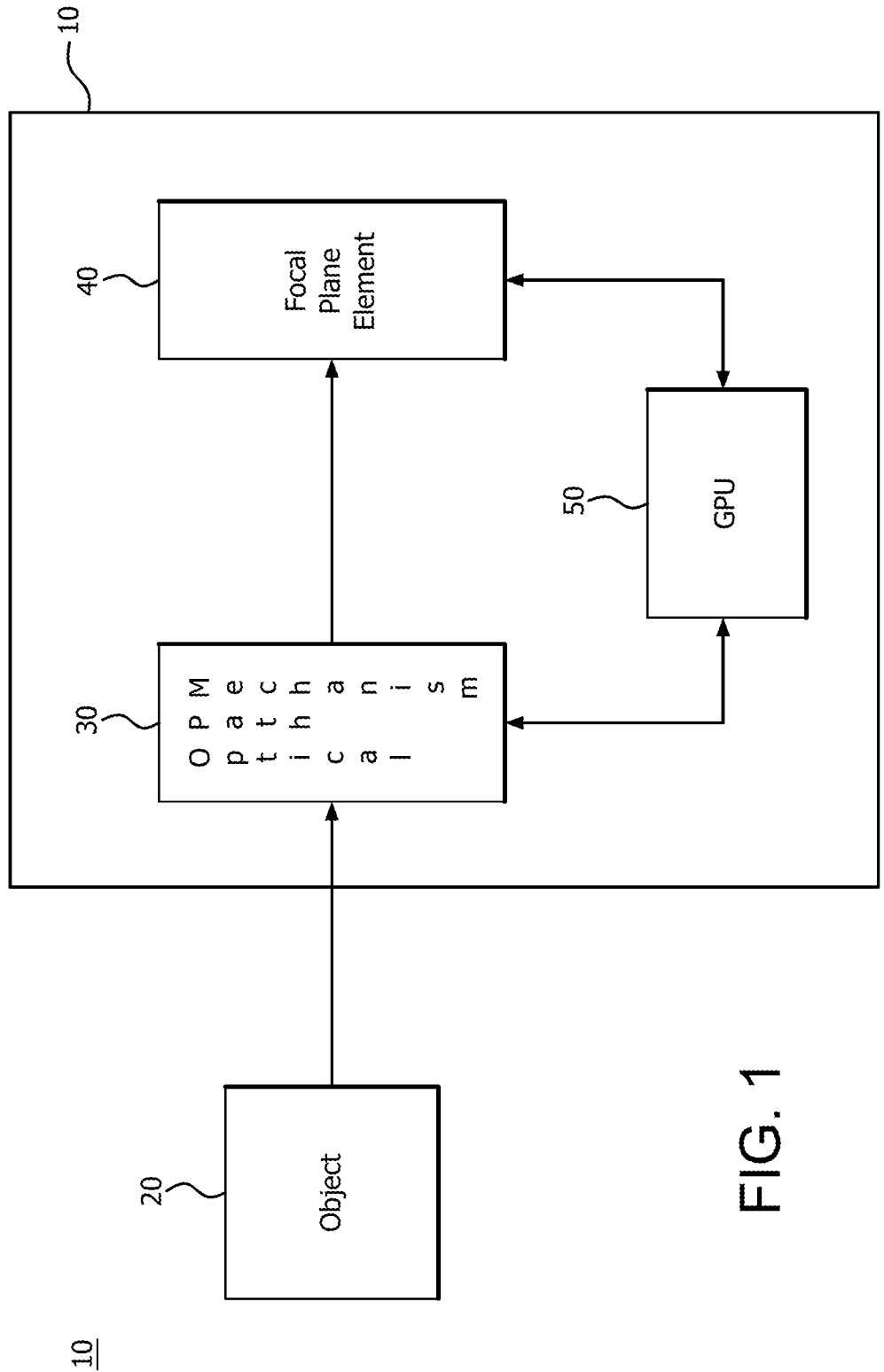
FIG. 1 illustrates a system block diagram illustrating an example system in which one or more features of the disclosure can be implemented.

FIG. 1 illustrates a system block diagram illustrating an example system 10 in which one or more features of the disclosure can be implemented. System 10 is used for imaging at least one object 20 and includes at least one optical path mechanism 30, one or more focal plane elements 40 and a plurality of GPUs 50. For sake of clarity, the present system 10 is depicted imaging a single object 20 using a single optical path mechanism 30, single focal plane element 40 and a GPU 50, although it would be understood that any number of any one of object 20, optical path mechanism 30, focal plane element 40 and GPU 50 can be utilized.

At least one object 20 is any object which can be viewed by an optical system or system 10. Object 20 can reflect therefrom numerous light rays that will be described herein below.

At least one optical path mechanism 30 includes any interaction with a ray bundle that can be included in a system, such as system 10. This at least one optical path mechanism 30 includes, without limitation, an optical element, reverse digital micromirror devices (DMD) elements, nanoelectromechanical systems (NEMS) structures, microelectromechanical systems (MEMS) structures, carbon nanotubes and other devices which manipulate light as controlled by the plurality of GPUs 50. Additional detail on the optical path mechanism 30 is included below.

One or more focal plane elements 40 include any number of focal plane arrays or sensors, including detectors in image systems and other focal elements. Additional detail on the focal plane elements 40 is included below.

Plurality of GPUs 50 includes any processing device and/or compute resources for processing pixel level data and/or controlling focal plane elements and/or optical path mechanisms. Plurality of GPUs 50 is used to integrate processing power at the optical path mechanism to preprocess light bundles prior to focal plane element 40 capture. For example, each processing element (as will be described below) of the plurality of GPUs 50 can be assigned to control a specific light bundle found within the light field (as will be described below).

Alternatively, plurality of GPUs 50 is used to integrate with an array of focal plane elements 40 typically present in an image sensor, to enable each focal plane element 40 to be treated as local elements to a processing element in the plurality of GPUs 50 to be scheduled and managed accordingly. Additional detail on the plurality of GPUs 50 is included below.

Figure 2:
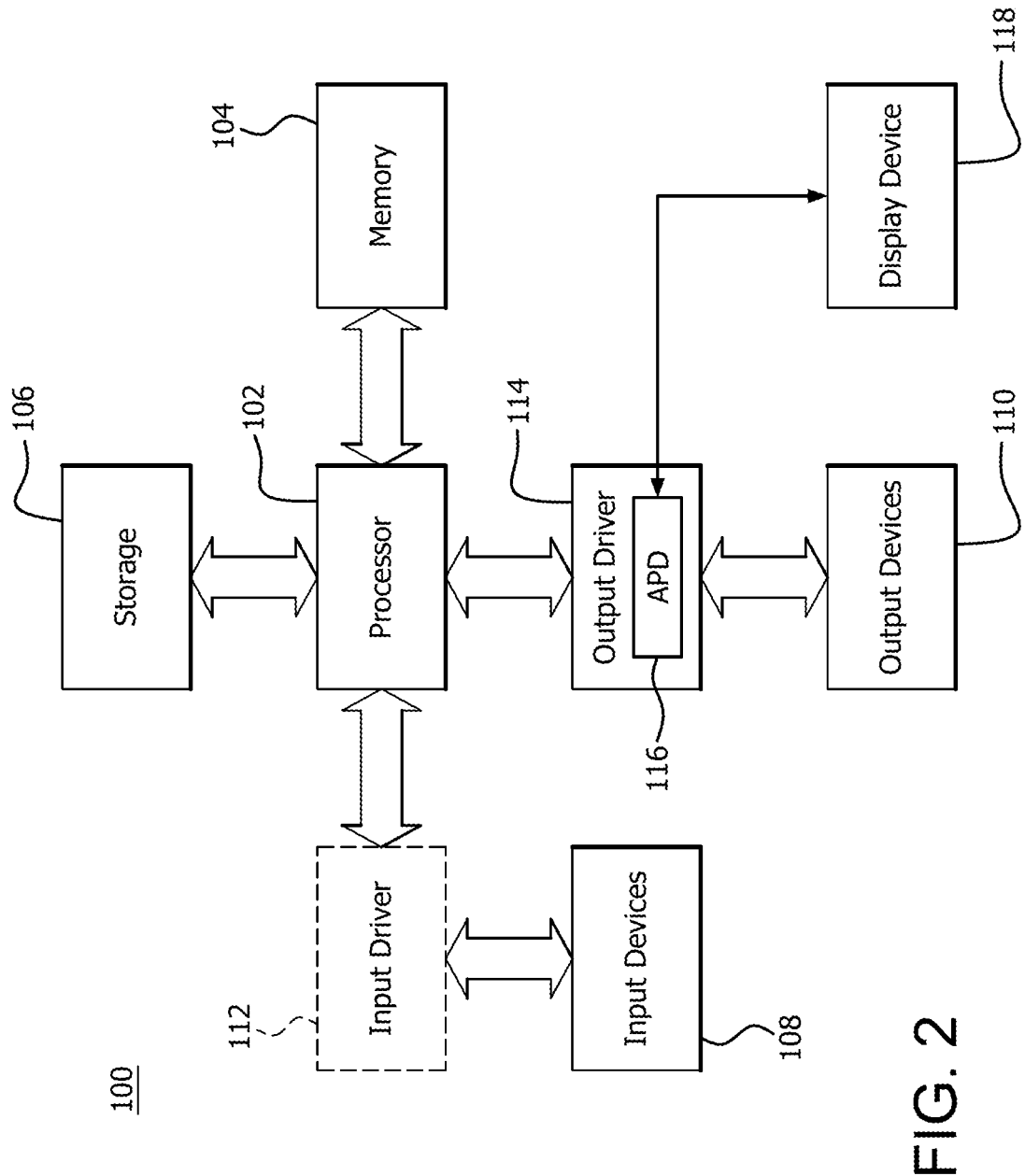
FIG. 2 is a block diagram of an example device in which one or more features of the disclosure can be implemented.

FIG. 2 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 2.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device (APD) 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data (SIMD) paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 3:
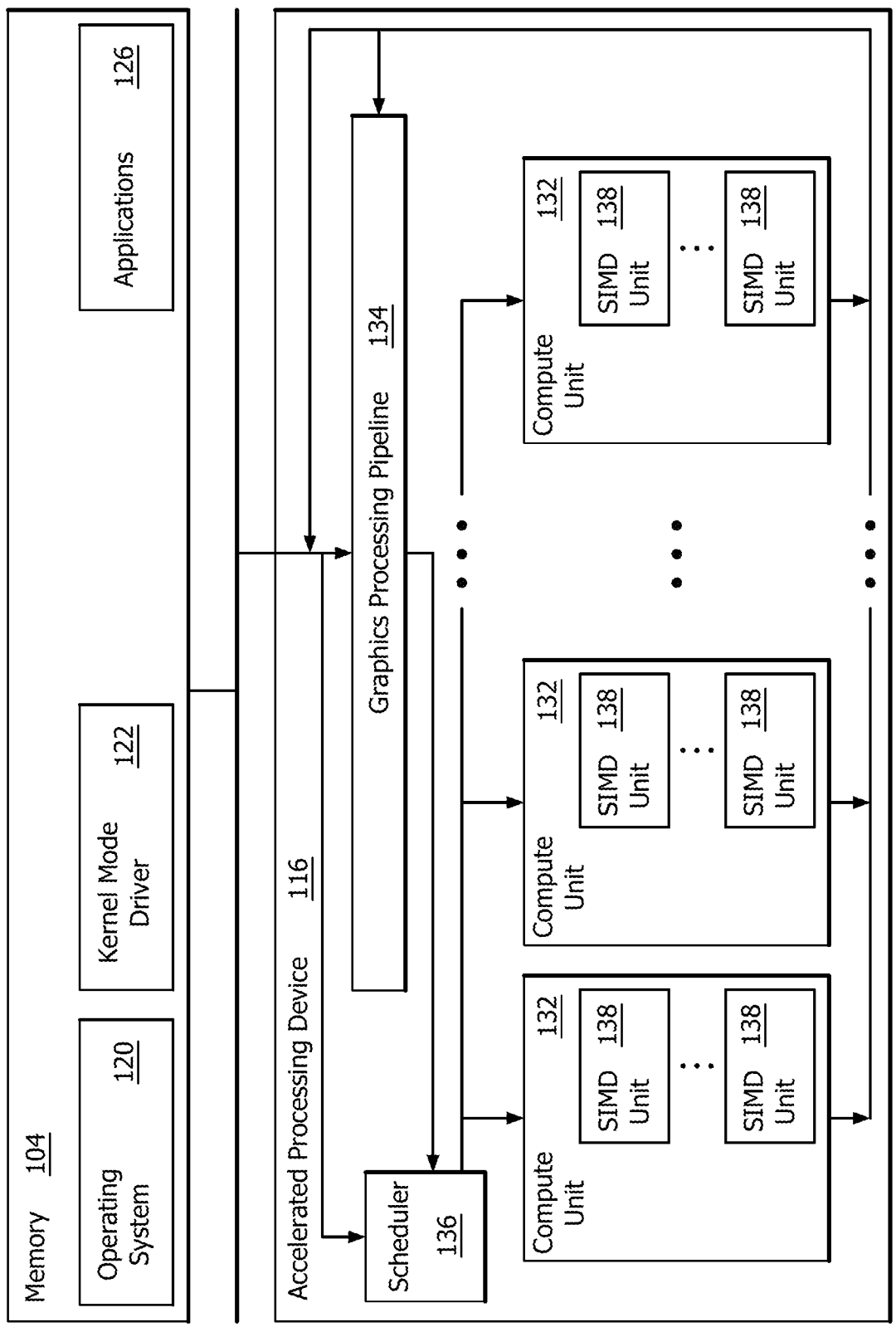
FIG. 3 is a block diagram of the device of FIG. 2, illustrating additional detail.

FIG. 3 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further details below) of the APD 116.

The APD 116 executes commands and programs for selected functions, such as graphics operations and non-graphics operations that can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 4:
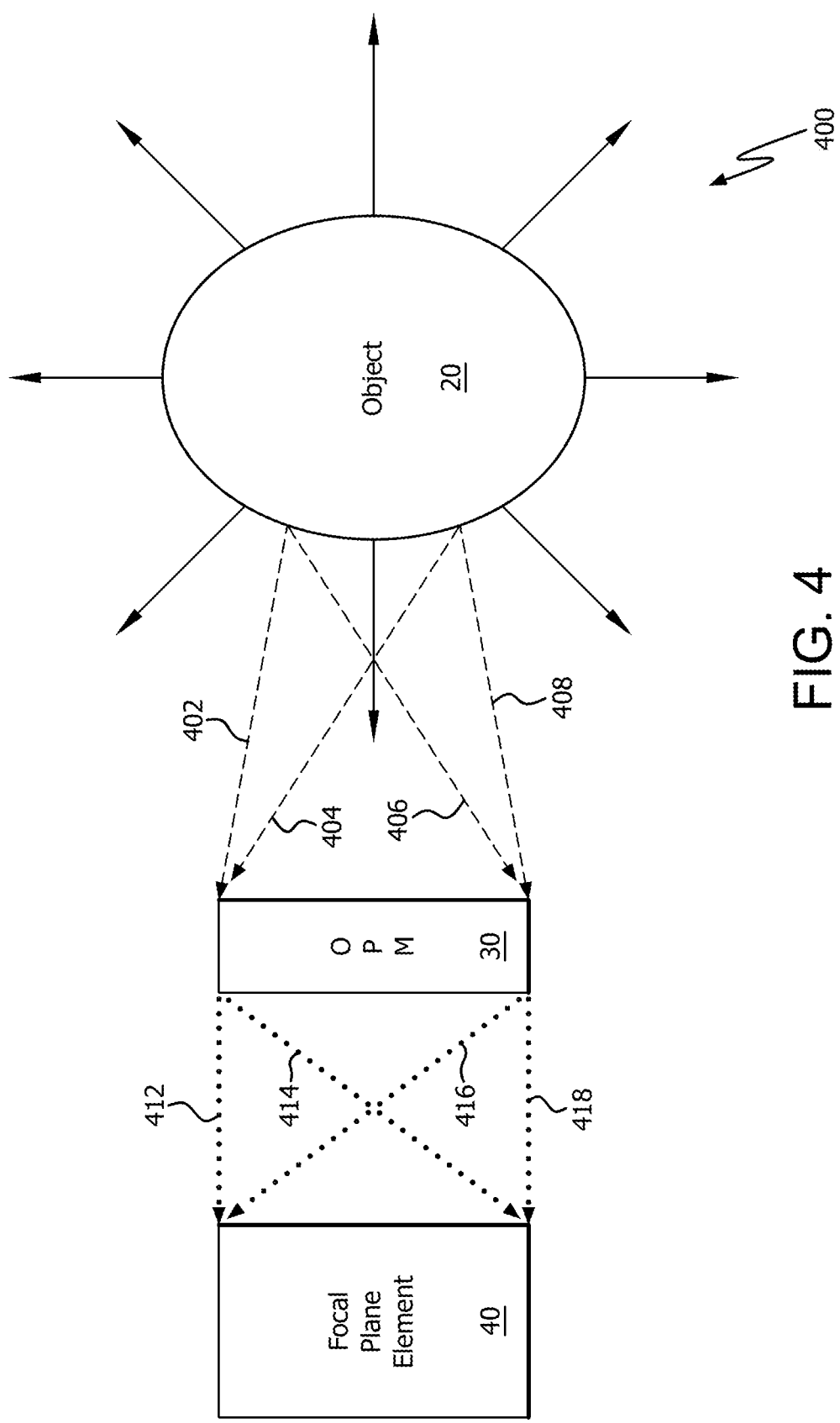
FIG. 4 illustrates a diagram of a light field emanating from an object of FIG. 1.

FIG. 4 illustrates a diagram of a light field emanating from object 20 of FIG. 1. Object 20 is illuminated from numerous light sources (not shown), including but not limited to, the sun, man-made light sources, and other light rays striking object 20. The illumination of object 20 (examples of which are indicated as solid or dashed lines) is reflected by object 20 in all directions. All of the rays reflected by object 20 represent the light field 400 emanating from object 20.

Certain rays 402, 404, 406, 408 of the light field 400 is incident on optical path mechanism (OPM) 30. Rays 402, 404, 406, 408 include information such as color of the object 20, intensity and direction. This information provides the information necessary to perceive the object 20. Optical path mechanism 30 provides a stereoscopic view of object 20 based on the dimensions of optical path mechanism 30 and capturing light from multiple vantage points. That is, the angular directions of the light rays are captured. This stereoscopic view allows perception of how far away object 20 is.

Optical path mechanism 30 relays the rays 402, 404, 406, 408 to the focal plane element 40 as rays 412, 414, 416, 418. The color, intensity and direction contained within rays 402, 404, 406, 408 is conveyed by optical path mechanism 30 to focal plane element 40 via rays 412, 414, 416, 418. By controlling the optical path mechanism 30 different viewpoints of object 20 are provided.

For a given light capturing device, GPU 50 assigns a processing element to at least one light bundle in the light field 400 and the light bundle's optical path mechanism 30. The processing element of GPU 50 can throttle or toggle individual light bundles in in the light field 400 based on feedback received by the processing element. In an aspect of this level of integration is noise management. In particular, dark current, vignetting (lens shading), chromatic aberration, and other noise sources. Some of this noise management can be mitigated or eliminated by using the processing element using temporal modulation at the optics level, such as manipulating focal length and aperture and other characteristics.

Integrating a grid of processing elements of GPUs 50 with an array of focal plane pixel elements of focal plane element 40 that are present in an image sensor. In particular, each focal plane element 40 can be treated as a "local element" to a processing element of GPU 50 and be scheduled and managed accordingly. This level of integration or framework enables processing the image data early (close to ground truth image information) and should reduce computation level and consequently power requirements.

An aspect of this level of integration is power management, and in particular, the effects of heat on the focal place elements 40 such as image sensors. As is well-known, image sensors are typically very sensitive to noise and in particular, dark current. Dark current, for example, doubles every 6° C. There are techniques for handling dark noise but they are not practical. For example, image sensors for astronomical imaging are cooled to −50° C. By integrating processing elements of GPU 50 with focal plane elements 40, local control of exposure times for the focal plane elements 40 is enabled. Local control of exposure times also enables capture of images with high dynamic range (HDR) using limited well-structure image sensors. Noise, dynamic range, bleeding, power and heat, and speed and conversion can be handled. The inventive structure also enables multi-spectral image capture, light field capture and other operational and functional modalities.

Each processing element of GPU 50 is responsible for some number of focal plane elements 40, resulting in an operational density that can enable deep learning capabilities and other advanced algorithms.

Figure 5:
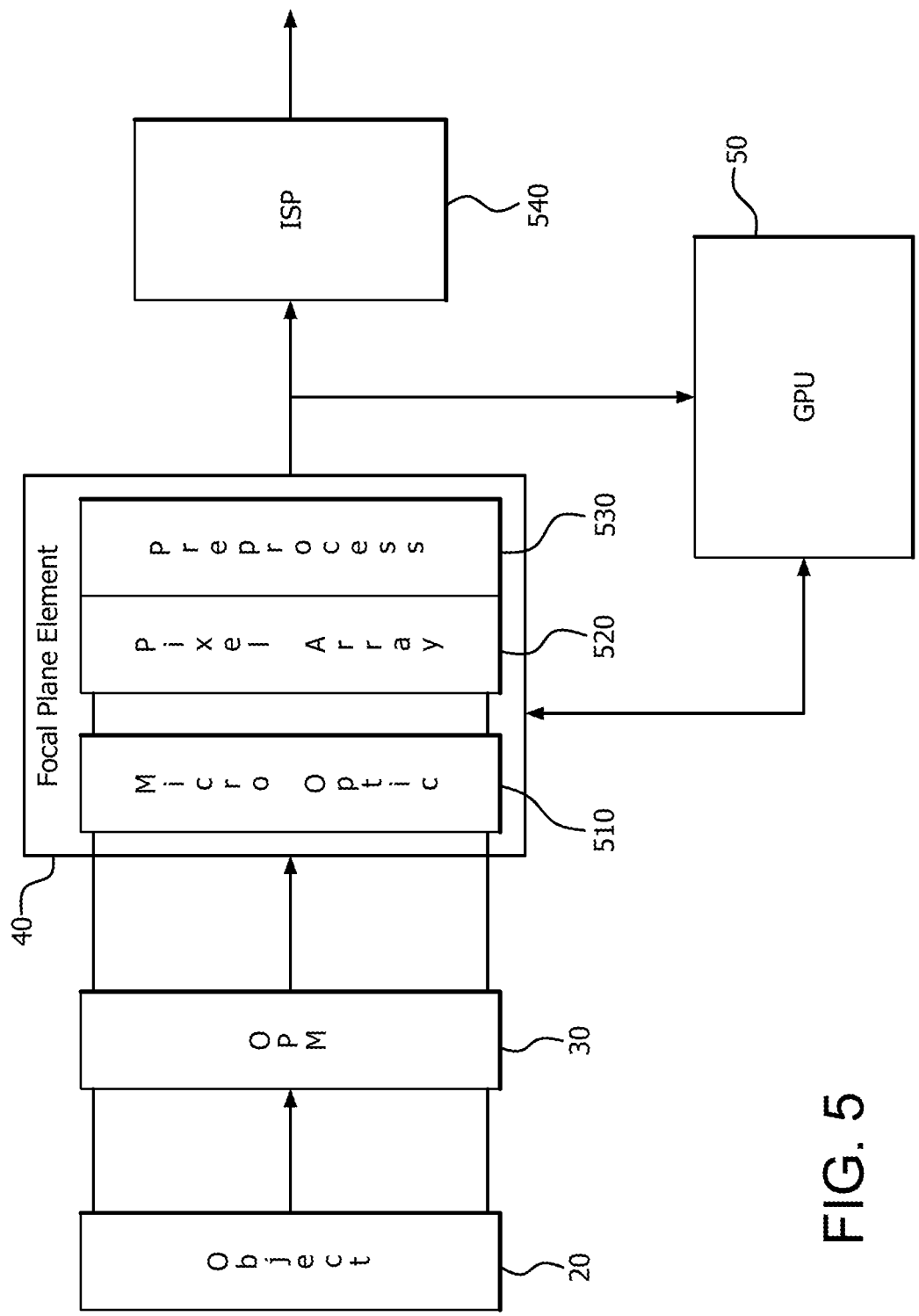
FIG. 5 illustrates further detail of the focal plane element of FIG. 1.

FIG. 5 illustrates further detail of focal plane element 40 of FIG. 1. In this more detailed representation of the focal plane element 40, focal plane element 40 is optically connected with object 20 via OPM 30, as is set forth in detail. Focal plane element 40 includes a micro optic 510, a pixel array 520 and preprocess electronics 530. GPU 50 is coupled to focal plan element 40. An image signal processor (ISP) 540 is used to readout the focal plane element 40. ISP 540 functions using parallel processing and can be used to perform any number of tasks as would be understood by those possessing an ordinary skill in the art.

Micro optic 510 can be any type of optic or micro optic that is controlled electronically, chemically or otherwise. Micro optic 510 is of a type similar to those described with respect to optic 30, for example, and other types of optics as will be detailed in the examples below. In some configurations, micro optic 510 is controlled and configured by GPU 50, such as through feedback, for example. Specific examples of this control and the associated configurations are described herein below.

Pixel array 520 is the detector or array that receives the incident light and operates to convert the photon in the incoming light to electrons, such as through a known process or conversion, for example.

Preprocess 530 refers to the electronics and processing performed with a processor in conjunction with a memory system allowing control of the output of electronic information to the system 10. In some configurations, preprocess 530 is controlled and configured by GPU 50, such as through feedback, for example. Specific examples of this control and the associated configurations are described herein below.

The parallel GPU 50 pixel computation is used for an initial taking and pre-processing of an image. This image is used to provide feedback control to the sensor component 40. The sensor component 40 includes micro optics 510, pixel array 520 and preprocess 530. GPU 50 controls micro optics 510 and preprocess 530 individually or collectively as determined by the configuration of use. Examples of such configurations are described below.

Figure 6:
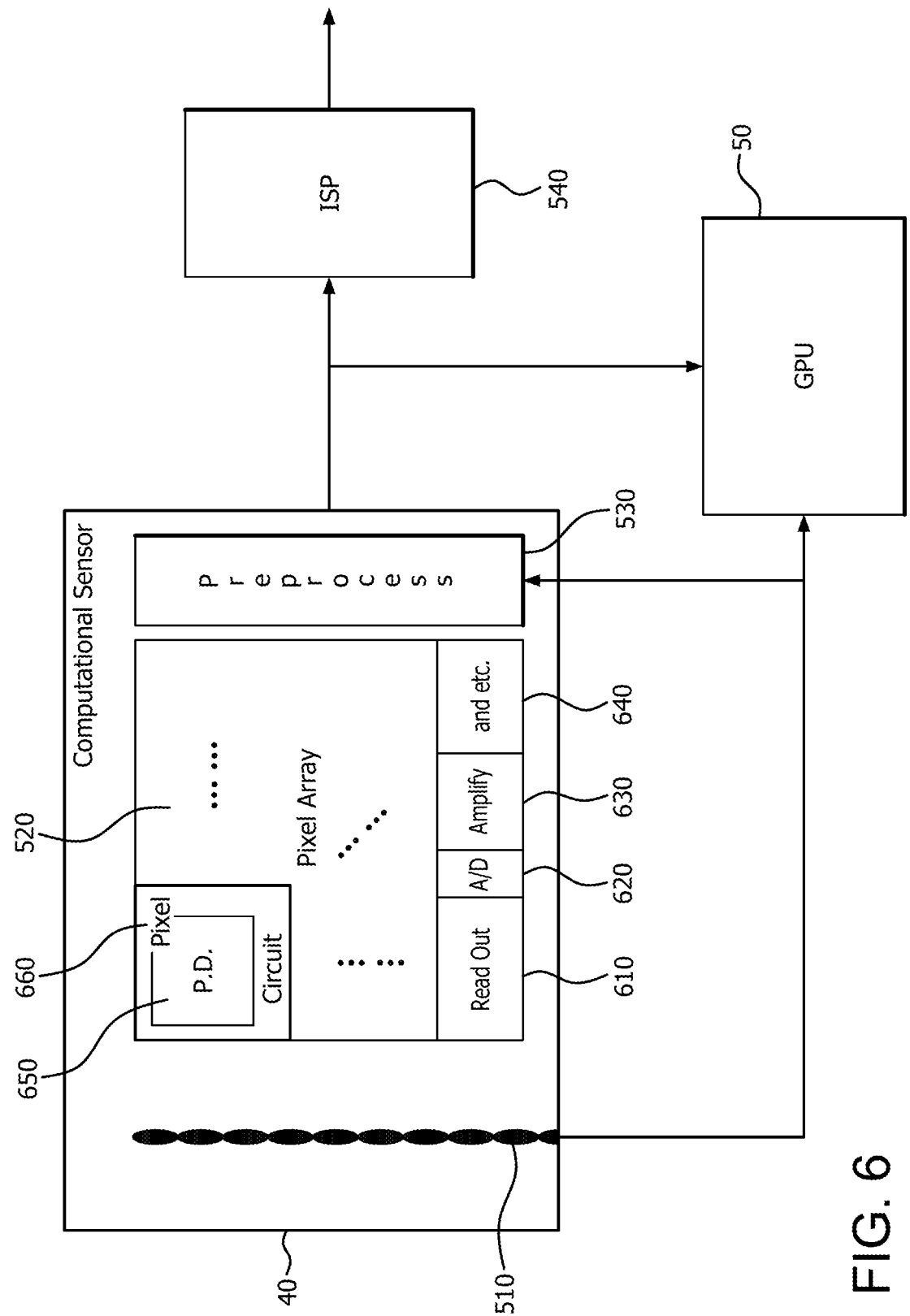
FIG. 6 illustrates additional detail of pixel array of FIG. 5.

FIG. 6 illustrates additional detail of pixel array 520. In one implementation, pixel array 520 includes a photon detector 650, a pixel readout circuit 660, readout electronics 610, at least one analog-to-digital (A/D) converter 620, at least one amplifier 630, as well as any additional read out or configuration electronics 640 necessary to readout pixel array 520.

Photon detector 650 includes any type of detector capable of receiving an image on which processing occurs. The detector 650 often requires readout electronics such as pixel readout circuit 660 and other readout electronics 610 that are determined and known based on the type of detector 650 being utilized. At least one A/D converter 620 is used to convert from analog to digital signals as is generally understood by those possessing an ordinary skill in detector arts. Similarly, at least one amplifier 630 is used to amplify the signals being received as needed.

As illustrated on FIG. 6, GPU 50 provides feedback and control of preprocess 530 and/or micro optic 510. GPU 50 control of preprocess 530 is configured to operate to effect the preprocessing via preprocess 530 of the pixel output after light strikes pixel array 520.

Figure 7:
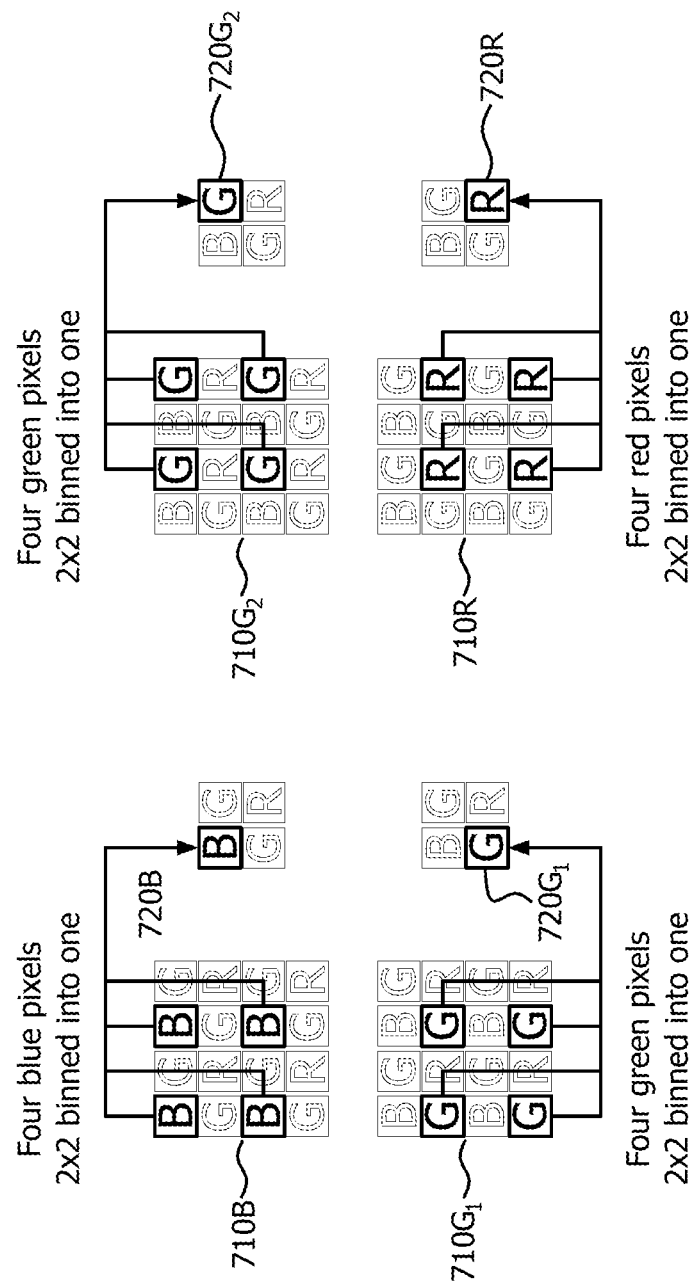
FIG. 7 illustrates an example of controlling the preprocess of FIG. 6 to select regions of interest (ROI) through selective binning.

FIG. 7 illustrates an example 700 of controlling preprocess 530 to select regions of interest (ROI) through selective binning. Binning is a conventional function of an image sensor to provide a lower resolution output while maintaining the field of view. As is illustrated in FIG. 7, there is a first example 700 of R/G/B (Red/Green/Blue) binning of a sensor. Binning allows charges from adjacent pixels to be combined and offers benefits in faster readout speeds and improved signal to noise ratios (SNR) albeit at the expense of reduced spatial resolution. More specifically, in example 700, a group of four blue pixels 710B are binned 2×2 into a single blue pixel 720B. A group of four green pixels 710G1 are binned 2×2 into a single green pixel 720G1. A group of four green pixels 710G2 are binned 2×2 into a single green pixel 720G2. A group of four red pixels 710R are binned 2×2 into a single red pixel 720R. The binning occurs as GPU 50 controls preprocess 530.

Figure 8:
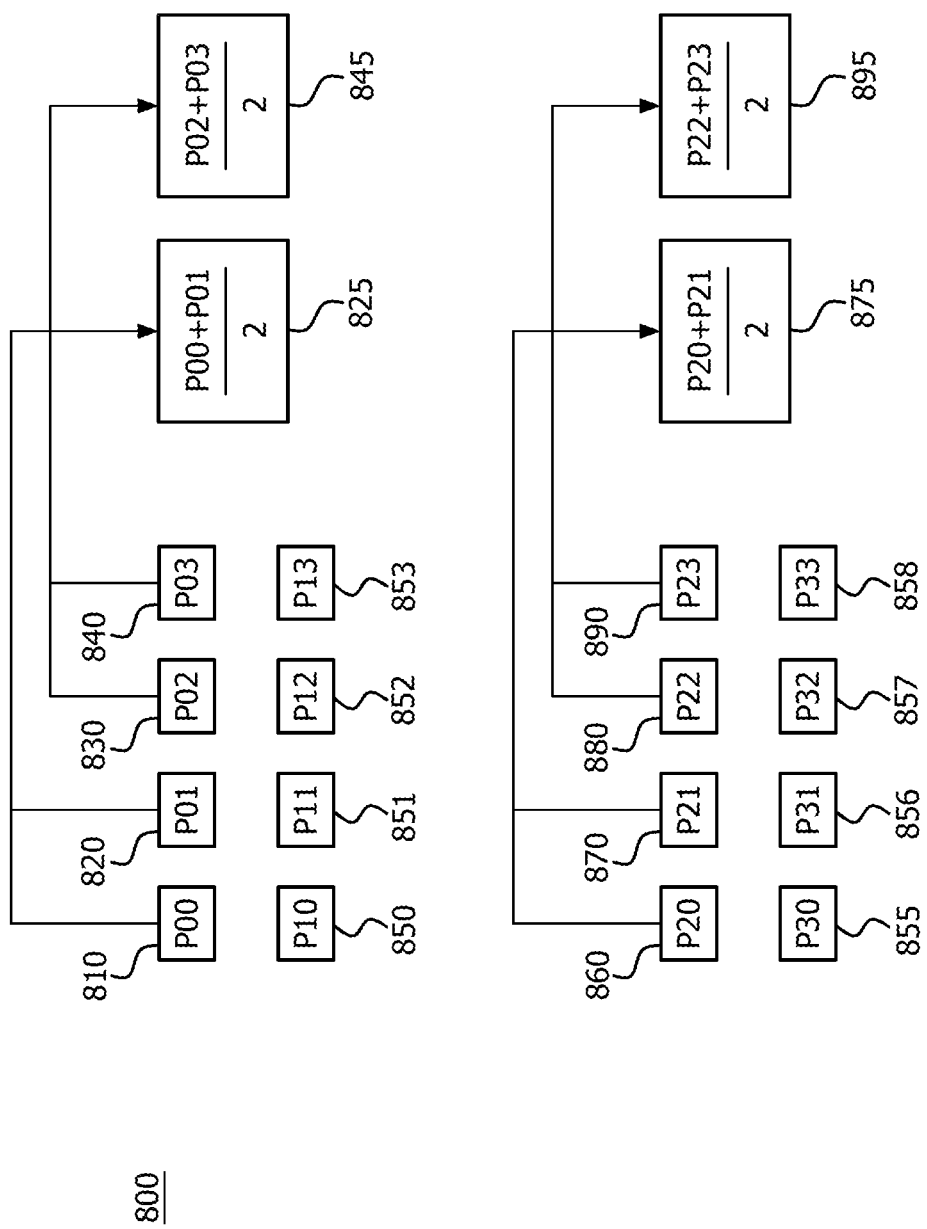
FIG. 8 illustrates another example of controlling the preprocess of FIG. 6 to select ROI through selective binning.

FIG. 8 illustrates another example 800 of controlling preprocess 530 with GPU 50 to select ROI through selective binning. In example 800, binning includes horizontal binning and vertical subsampling. A pixel set represented horizontally within pixel array 520 includes a first row of pixels P00 810, P01 820, P02 830, P03 840, a second row of pixels P10 850, P11 851, P12 852, P13 853, a third row of pixels P20 860, P21 870, P22 880, P23 890, and a fourth row of pixels P30 855, P31 856, P32 857, P33 858. The first row of pixels are binned such that pixel P00 810 and pixel P01 820 are combined such as by adding their respective values and dividing by two (the number of pixels being combined) and registering that value in a binned pixel 825 and pixel P02 830 and pixel P03 840 are combined such as by adding their respective values and dividing by two (again the number of pixels being combined) and registering that value in a binned pixel 845. While the second row is illustrated as not including binning, this representation is an example only, as binning can be included in the second row. This is selective ROI.

The third row of pixels are binned such that pixel P20 860 and pixel P21 870 are combined by adding their respective values and dividing by two (again the number of pixels being combined) and registering that value in a binned pixel 875 and pixel P22 880 and pixel P23 890 are combined by adding their respective values and dividing by two (again the number of pixels being combined) and registering that value in a binned pixel 895. While the figure does not illustrate the fourth row as being binned, it certainly could include binning as would be understood from the example.

In the selective binning of ROI, such as examples 700 and 800, ROI selective binning control the binning process on the pixel array 520 with ROI binning performed according to GPU 50 computing feedback to distinguish some special region (ROI). A ROI can include, for example, low spatial response of the image, which means that the content detail level and variation of signal level of this ROI area is minimal and relatively flat region of the image. The binning operates as a low pass filter in this case, and based on feedback of GPU 50. The binning can achieve control for reasonable small region to use binning and variable equivalent spatial sampling. For example, GPU 50 uses a filter in video sequence to track the edge of the image and sample distribution to provide the feedback.

Local aperture control is achieved by implementing binning as well. By combining the techniques described for combined ROI selection, the binning function can also achieve equivalent local aperture control directly on pixel array 520. This local aperture control is used in a situation where there is a dark object in the image, The binning increases the read out value in this region to boost the luminance level of the dark object. Binning aids auto exposure (AE) and (local tone mapping) LTM of subsequent conventional ISP 540 function.

Dynamic range is achieved by implementing binning as well. By combining the techniques described for combined ROI selection, the dynamic range of the final output pixel level is increased, since both SNR (signal-to-noise ratio) and luminance level can be improved by binning. For example, a 10-bit sensor output can be easily improved to a half-bit dynamic range using binning. The binning occurs as GPU 50 controls preprocess 530.

Figure 9:
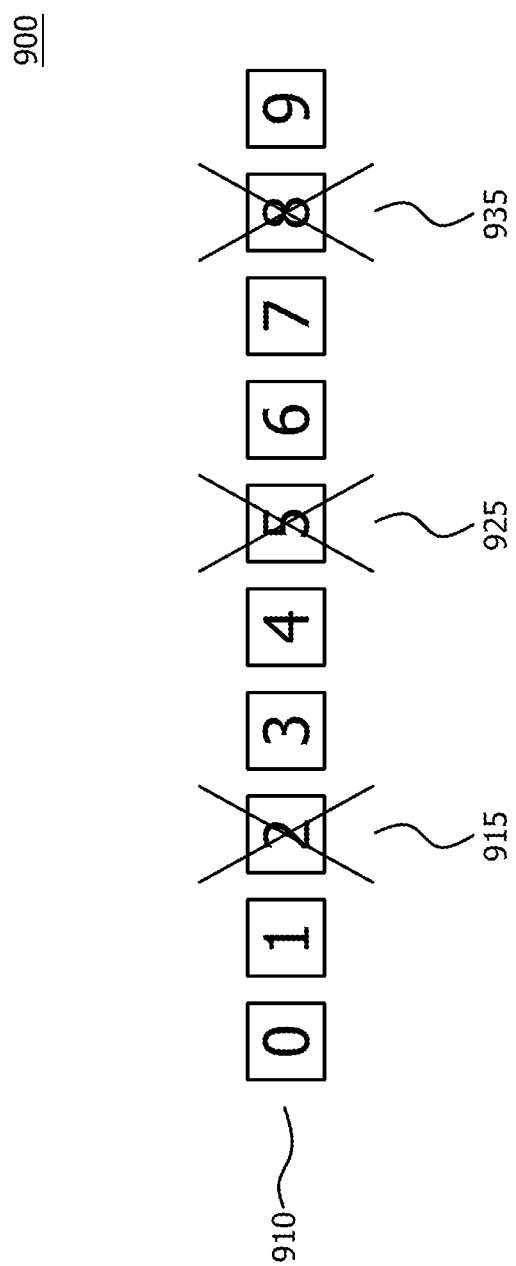
FIG. 9 illustrates an example of controlling the preprocess by the GPU using decimating.

FIG. 9 illustrates an example 900 of controlling preprocess 530 using decimating. Decimating of pixel array 520 is to remove (in a read out sense) a certain percentage of the pixels, such as 1 out of 10, for example. In FIG. 9, a row 910 of pixels includes pixels numbered 0-9. Decimating 1 in 3 pixels operates through preprocess 530 as if pixel 2 is not read, i.e., decimated as shown 915, pixel 5 is not read, i.e., decimated as shown 925, pixel 8 is not read, i.e., decimated as shown 935. Adaptive decimating output on pixel array 520 by ROI variable sample density according to GPU 50 feedback, for example, depends on spatial frequency response.

Figure 10A:
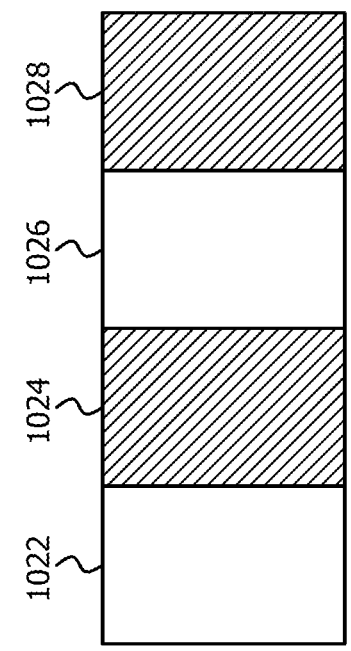
FIGS. 10A-10D illustrate an example of controlling the preprocess by the GPU using filtering.
Figure 10B:
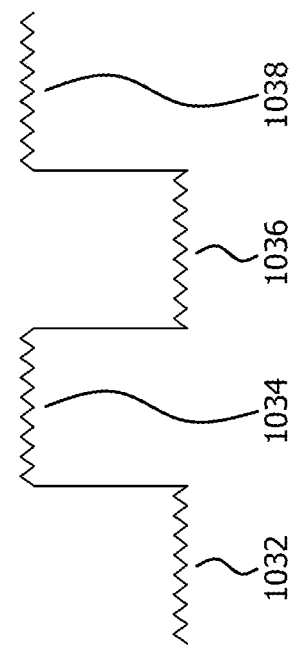
Figure 10C:
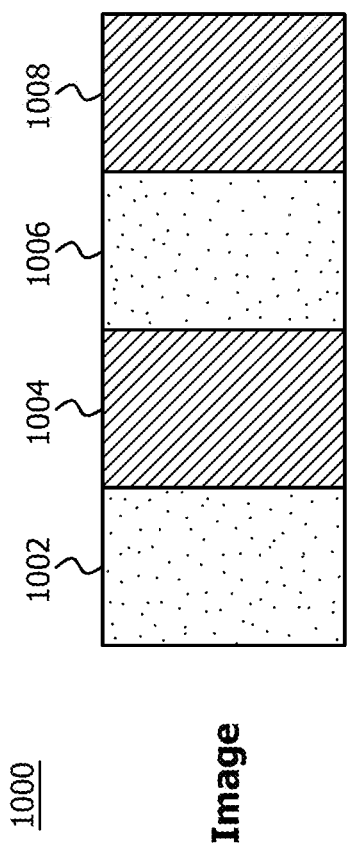
Figure 10D:
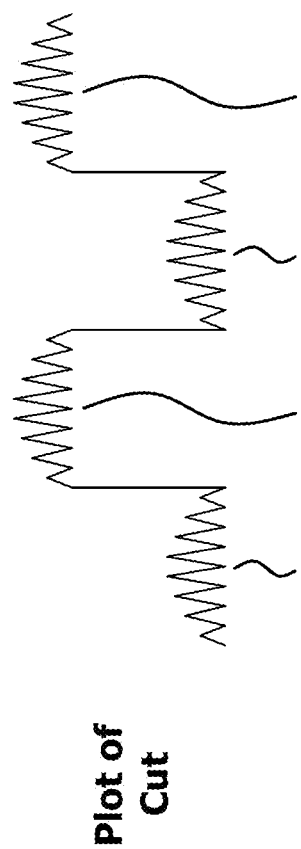

FIGS. 10A-10D illustrate an example 1000 of controlling preprocess 530 using filtering. Example 1000 provides an illustration of a Gaussian filter being applied to an image via preprocess 530 as controlled by GPU 50. An image is taken and four pixels of a checkerboard are shown in image (FIG. 10A). The first pixel 1002 is white but includes some noise. The third pixel 1006 is similar to the first pixel 1002. The second pixel 1004 is black and also includes some noise. The fourth pixel 1008 is similar to the second pixel 1004. A plot of the intensity of the four pixels is provided in plot (FIG. 10B). As is illustrated, the noise is shown by the jagged nature of the plots. Portion 1012 representing the first pixel 1002 is intended to be white but also includes the noise. Similarly, portion 1014 representing second pixel 1004, portion 1016 representing third pixel 1006 and portion 1018 representing fourth pixel 1008 demonstrates the noise. By applying a Gaussian filter of example 1000, the image is transformed as image (FIG. 10C) where the noise in the first pixel 1022, second pixel 1024, third pixel 1026, and fourth pixel 1028 are reduced. This is illustrated by the less jagged nature of the plots provided in the plot (FIG. 10B). Portion 1032 representing the first pixel 1022 is intended to be white and more closely represents the white pixel with decreased noise as compared to the non-filtered image (FIG. 10A). Similarly, portion 1034 representing second pixel 1024, portion 1036 representing third pixel 1026 and portion 1038 representing fourth pixel 1028 demonstrates the reduction of the noise by application of a Gaussian filter. Different kinds of linear filters implemented via preprocess 530 can be used. Filter types includes, for example, Gaussian weighted filter, Laplacian filter, Sobel operator. These filters in preprocess 530 are configured by GPU 50 feedback.

FIG. 11 illustrates an example 1100 of controlling preprocess 530 using ROI. Example 1100 provides an illustration of configuring ROI according to GPU 50 computing based on types of photons striking the detector 1110. These ROI can be as selected boundaries for segmentation for subsequent possible ISP or computer vision process. The shape of the ROI is not necessary to be rectangular as conventional ROI setting in common camera/ISP system, and even can be non-convex depending on the requirement of subsequent process. By way of example in FIG. 11, shapes can be square or rectangular 1120, round 1130, triangular 1140, or other shapes, such as mouth-like 1150. The binning occurs as GPU 50 controls preprocess 530.

Figure 12:
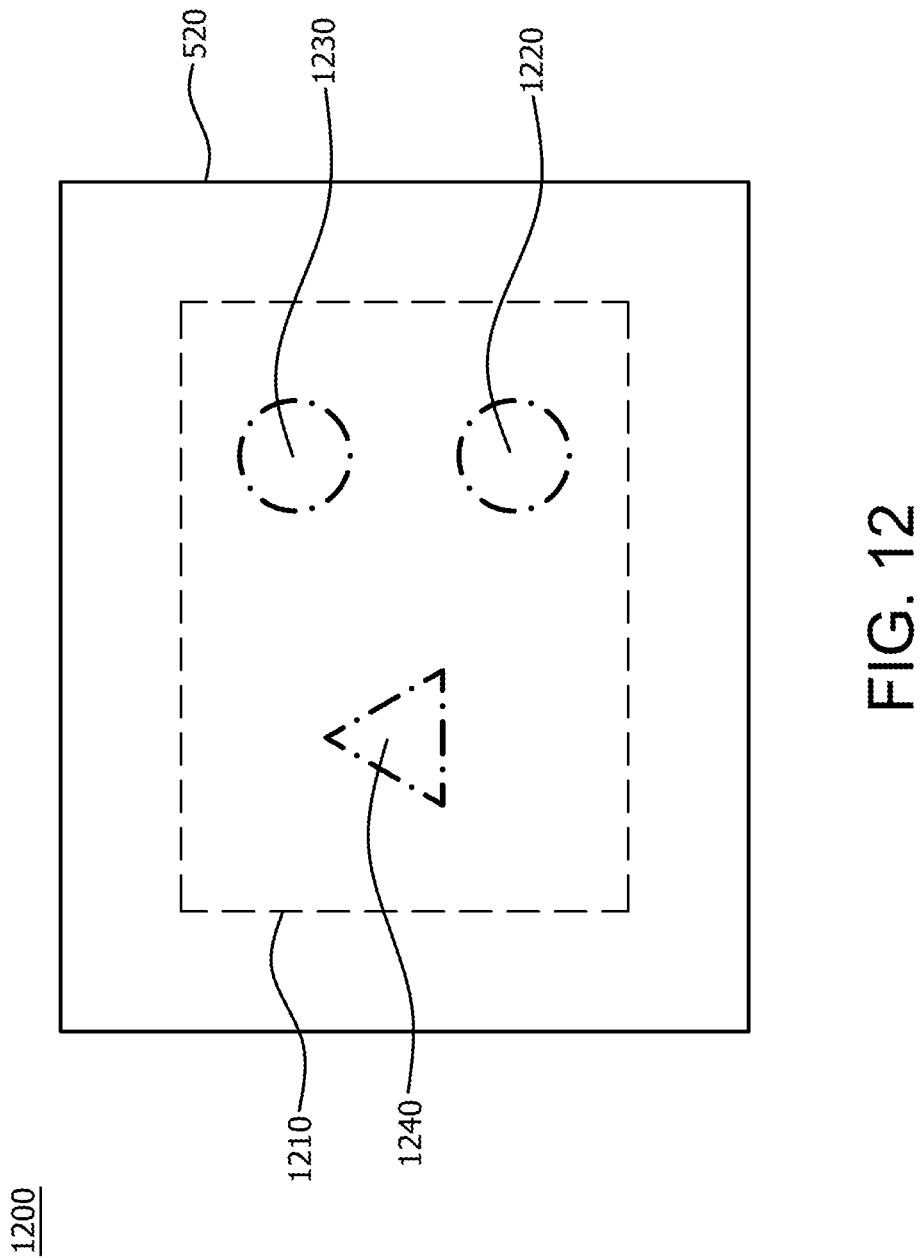
FIG. 12 illustrates an example of controlling the preprocess by the GPU using cropping.

FIG. 12 illustrates an example 1400 of controlling preprocess 530 using cropping. Example 1400 includes pixel array 520, and a cropped or reduced sample size using a fixed window 1410 that represents a subset of pixel array 520. Fixed window 1410 can be designed to be any size or shape as compared to pixel array 520. For example, a window 1420 can be used where window 1420 is circular. Other similar windows can also be used, such as window 1430 which is also circular. Other shaped windows can also be used, such as a triangle window 1440, for example. Cropping provides frame sample size reduction based on ROI or fixed window configurations. The binning occurs as GPU 50 controls preprocess 530.

Figure 13:
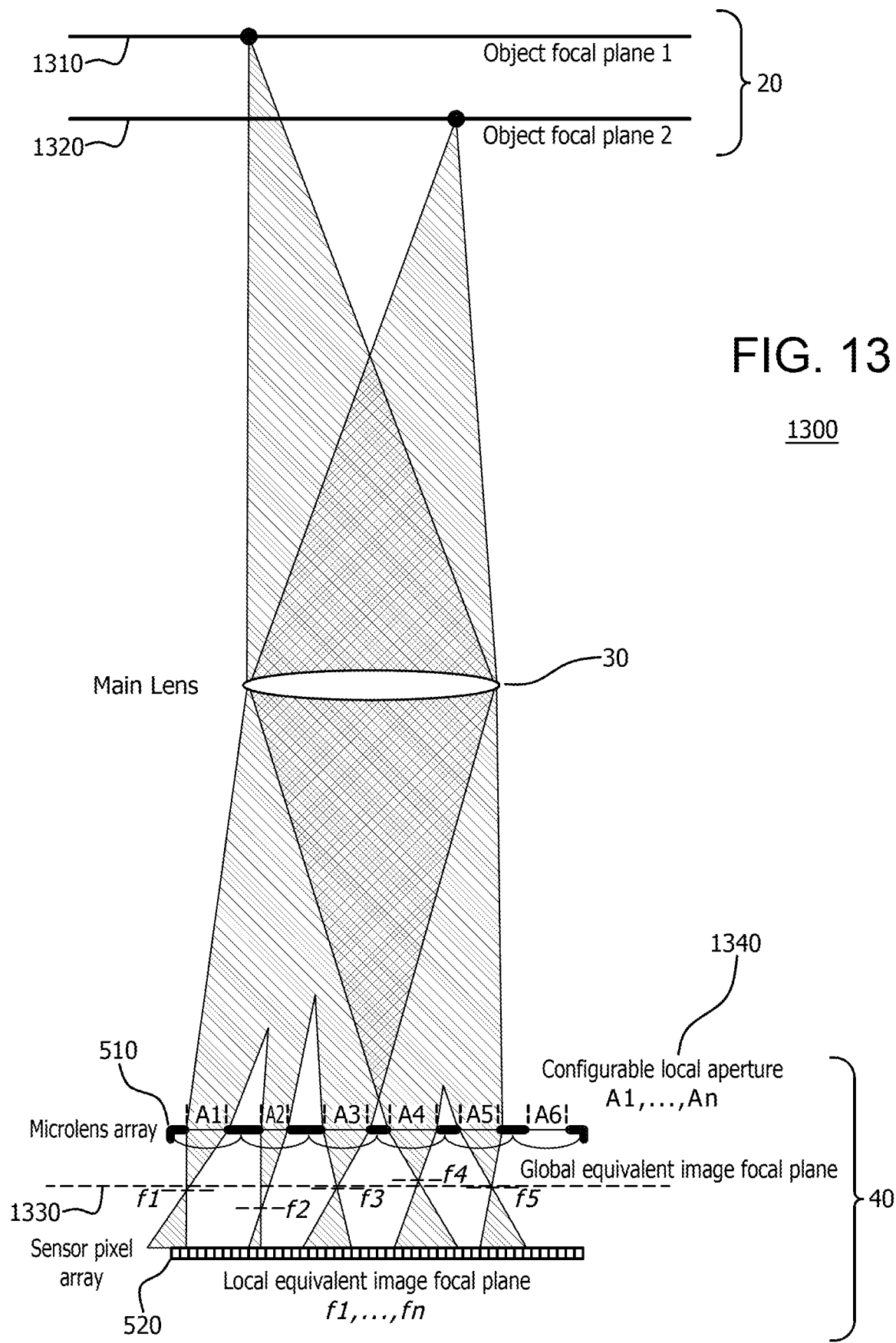
FIG. 13 illustrates an example system representing GPU control of the micro optic to provide aperture control.

FIG. 13 illustrates an example system 1300 representing GPU 50 control of the micro optic 510 to provide aperture control. For example, the micro optic 510 can be configured by either physical or chemical method to achieve different effective focal plan for reasonable small region, which can effectively change the local DoF (depth of field), focal length and dynamic range. FIG. 13 illustrates an example system 1300 representing control of the micro optic 510 that specifically provides aperture control. System 1430 is configured as described above with respect to at least FIG. 1 and FIGS. 5 and 6 and includes focal plane element 40 including micro optic 510, pixel array 520, and focal plane preprocess 530. GPU 50 from FIGS. 1, 5, 6 is not shown in system 1300, although GPU 50 controls micro optic 510, its configuration and provides feedback from focal plane 40 to achieve the desired effect provided by micro optic 510.

Object 20 is illustrated in FIG. 13. Object 20 can include any number of focal planes. Object 20 as illustrated include object focal planes 1310, 1320. OPM 30 images the object focal plane(s) to focal plane element 40. As described in FIGS. 5, 6 focal plane element 40 contains micro optic 510 and pixel array 520. Focal plane element 40 also include preprocess 530 (not shown in FIG. 13). Micro optic 510, illustrated as a micro lens array, reimages the object focal plane the configurable local apertures 1340 to an image focal plane 1330, which is then incident upon pixel array 520.

The aperture control creates a shutter mechanism for a pixel or groups of pixels in the pixel array 520. FIG. 13 illustrates a configurable local aperture micro optic 510, such as a micro lens, for example, from a geometric optics point of view distinct from conventional light field techniques of recording light fields with global setting. Using the geometric optics, the re-focusing, DoF compensation could be adaptively adjusted and optimized in real-time. For example, an image of all clear objects at different distances can be obtained even if the real world distance range is quite large. As a result, a re-focus can be performed in one single image rather than several separate images as has been done in conventional light field imaging technology. This occurs because the local focal planes can be adjusted to very close to one global equivalent focal plane, equivalently the local aperture configuration according to GPU computing feedback.

Figure 14:
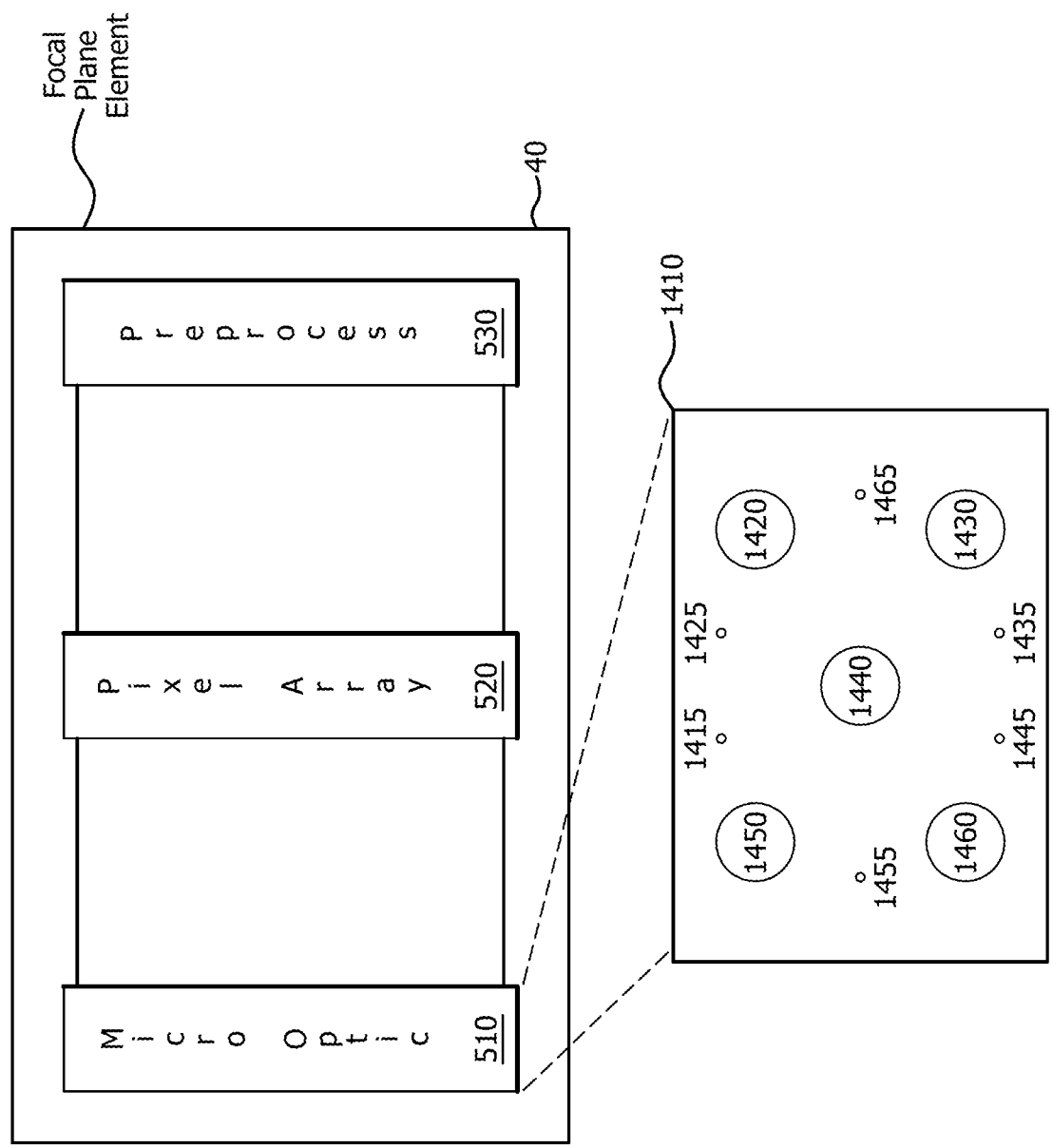
FIG. 14 illustrates an example system representing an optic that provides aperture control.

GPU 50 control of micro optic 510 is further illustrated in FIG. 14 and is configured to operate to control micro optic 510 to affect the qualities of the light striking pixel array 520. FIG. 14 illustrates an example system 1400 representing control of the micro optic 510 that again provides aperture control. System 1400 is configured as described above with respect to at least FIG. 1 and FIGS. 5 and 6 and includes focal plane element 40 including micro optic 510, pixel array 520, and focal plane preprocess 530. GPU 50 from FIGS. 1, 5, 6 is not shown in system 1400, although GPU 50 controls micro optic 510, its configuration and provides feedback from focal plane 40 to achieve the desired effect provided by micro optic 510.

The aperture control creates a shutter mechanism for a pixel or groups of pixels in the pixel array 520. Micro optic 510 can be of a similar type to optic 30, or can take the form of one of the examples described with respect to optic 30. This is achieved using the optic by working on a single area of micro optic 510 or by grouping portions of optic into larger segments of micro optic 510. As is shown in the exploded view 1410 of micro optic 510, grouping can occur to create larger areas of the optic that are grouped together, such as groups 1420, 1430, 1440, 1450, 1460. Other portions can be specifically controlled such as single areas 1415, 1425, 1435, 1445, 1455, 1465. These groupings 1420, 1430, 1440, 1450, 1460 and areas 1415, 1425, 1435, 1445, 1455, 1465 provide the ability to control a shutter mechanism for each bundle. The shutter mechanism creates a unique pixel exposure by effectively adding a switch and ADC 620 (from FIG. 6) to every pixel.

This provides individually timed exposures for each area 1415, 1425, 1435, 1445, 1455, 1465 or group 1420, 1430, 1440, 1450, 1460, by using this kind of switch and ADC 620 type of arrangement, by providing a shutter mechanism for a local area within the field of view. While not actually using a switch and ADC 620, the shutter control in areas 1415, 1425, 1435, 1445, 1455, 1465 and groups 1420, 1430, 1440, 1450, 1460 operates to control exposure to portions of or light bundles. The areas 1415, 1425, 1435, 1445, 1455, 1465 or groups 1420, 1430, 1440, 1450, 1460 can be small or large and any size as needed. Each area 1415, 1425, 1435, 1445, 1455, 1465 is generally isolated and assigned the same shutter and timing for that group 1420, 1430, 1440, 1450, 1460 allowing selectivity for controlling small light bundles in small areas of the image.

These timed exposures can also be useful to remove motion from images or frames. There are two types of motion—interframe motion, which is motion between frames of a video, and intraframe motion, which is motion inside one frame of capture. Aperture control is one of the tools to control intraframe motion. Aperture control is used to control interframe motion because this type of motion is temporal in nature.

In the spatial type of intraframe captures, aperture control is the main mechanism that is used to either allow or not allow the motion. There are occasions where there is a desire to have an effect of a blurry element in motion, but often times this desire does not exist. There can instead be a desire to make the picture look sharp even if there is a little bit of motion involved.

The depth of field can be defined by virtue of aperture control and provide global control of the aperture, and thereby stop down the optics. The aperture can be controlled within the bundle. This provides a dual mechanism to control depth of field. That is, depth of field can be controlled globally by controlling the aperture, or individual areas or small areas within a light bundle can be controlled using individual depth of field control. There can be cases where a group or cluster of apertures can be moved independent of the other apertures. The limit of phase shift is defined by the pixel center distance and the effective aperture size. The effective aperture can be controlled as a function of local micro-aperture and local control of aperture size and location. As a result, the CRA can be controlled as a local function, allowing for regional optimization of CRA effects.

For example, if a very bright object was moving against a very dark background, which is not moving, it can be desirable to have the dark background be exposed with as much aperture as possible. Normally, this would saturate the object because of its brightness. Using the light bundle to control the dynamic range, these issues are resolved and the exposures can be controlled. The depth of field and the exposure control provides the option of controlling individually or locally within the image, or within the frame.

An initial image or subimage can be taken and processed to provide feedback or information on the scene of an image. This feedback can be created by capturing an initial set of information from the initial image or subimage to get an idea of the scene. Once that initial information is known, then the power of the GPU is sufficient (current operations are in the neighborhood of 200 to 1000 operations per pixel) to be able to run through all the calculations and either use a number of different techniques, such as gamma filters, tracking filters or other techniques provided the spatial and temporal behavior is in this field of view. This is similar conceptually to using red-eye reduction or auto-exposure algorithms by taking an initial image and flash and then the desired image. Convergence algorithms are used to converge on the target and are generally well understood in the art, applied here with expanded control using increasingly narrower and finer grain regions of the image through these light bundle modulation types of schemes described herein. This in essence creates thousands of cameras inside the lens with the GPU controlling each one.

Figure 15:
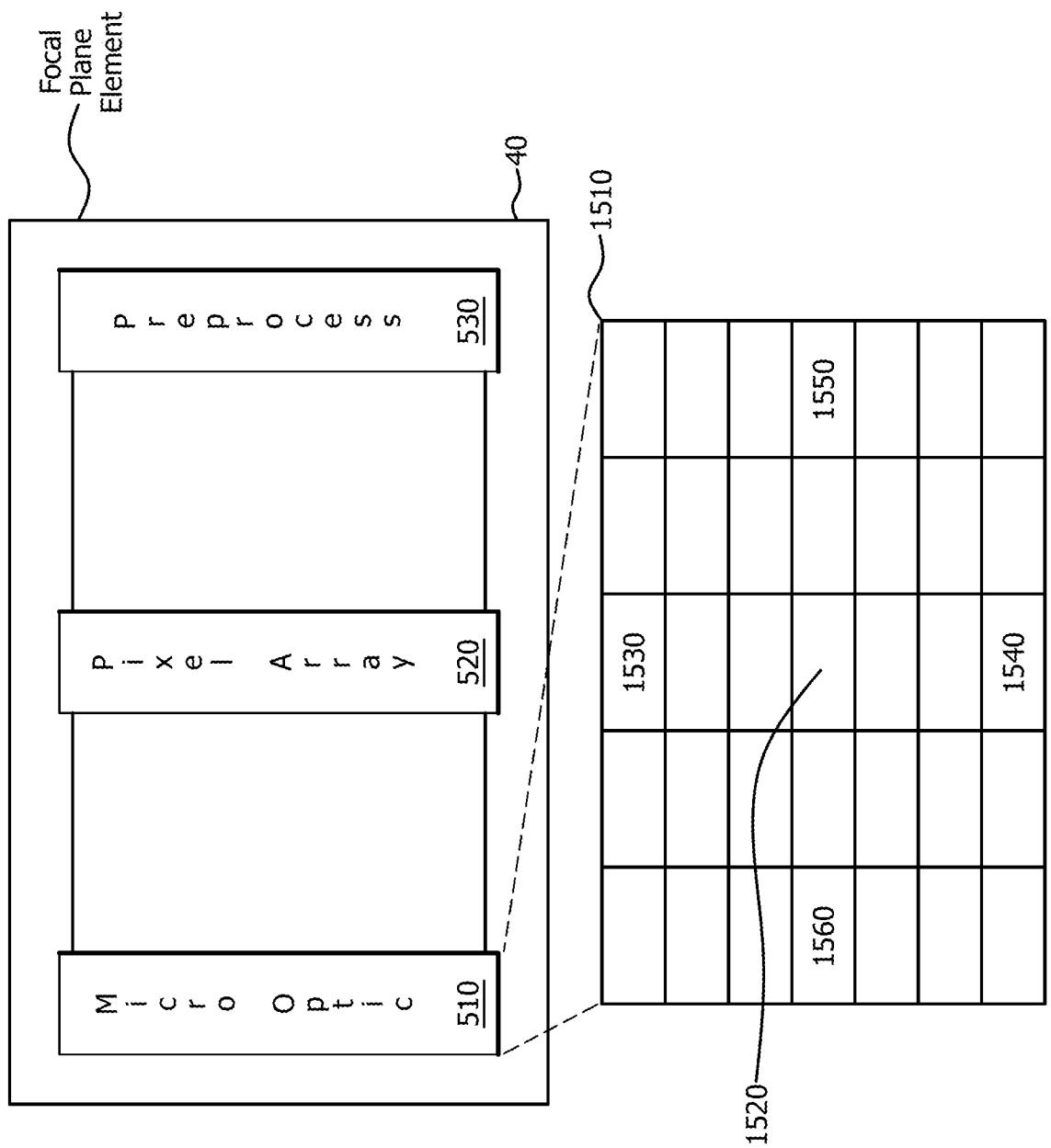
FIG. 15 illustrates an example system representing an optic that provides aperture control.

FIG. 15 illustrates an example system 1500 representing control of the micro optic 510 that provides aperture control. System 1500 is configured as described above with respect to at least FIG. 1 and FIGS. 5 and 6 and includes focal plane element 40 including micro optic 510, pixel array 520, and focal plane preprocess 530. GPU 50 from FIGS. 1, 5, 6 is not shown in system 1500, although GPU 50 controls micro optic 510, its configuration and provides feedback from focal plane 40 to achieve the desired effect provided by micro optic 510.

In modifying micro optic 510, the focal length is modified. This changes the optics in terms of its magnification including spatial magnification. By way of example, if there is a telephoto lens, a portion of the lens, such as a group of lenses in the middle of the telephoto lens, is moved to affect the focal length of the lens. Importantly, the back focal length of the lens, the distance from the back of the lens to the focal plane, is maintained. This movement of the lens has the effect of changing the trajectory of each of the rays of light coming into the optics.

In the configuration of FIG. 15, there is a digital version of a telephoto lens without moving any lenses. By way of example, if micro optic 510 provides the capacity to individually control the bundles of light and steer each. As discussed above, the aperture example modulated the amount of light passing through or being included in the bundle. In this case, though instead of modulating the light through the bundle, the bundle is modulated or steered. This projects the bundle onto the focal plane at another pixel, another location, and has the effect of magnifying or reducing the field of view by virtue of changing the effective focal plane. That is, there is a mechanism by which virtual zoom is achieved without changing or without altering the physical location of the optics.

In optic 1510, there is a portion 1520 approximately at the center. The angle of this portion 1520 is modified to move the light bundle from the center of pixel array 520 to an edge, for example. This dynamic angling of the beam changes the focal length based on the triangle created by the back focal length and the amount the image is moved within the focal plane. The change in focal length is realized on the remaining leg of the formed triangle, while maintaining the distance from the last element in the optics to the sensor.

Similarly, the light bundles striking optic 1510 at positions 1530, 1540, 1550, 1560 can be moved across the pixel array 520. For example, light bundle striking portion 1530 can be moved to register in the pixel array 520 at the point where light bundle striking portion 1540 in an unmodified state strikes the pixel array 520, and vice versa. Similarly, light bundle striking portion 1550 can be moved to register in the pixel array 520 at the point where light bundle striking portion 1560 in an unmodified state strikes the pixel array 520, and vice versa.

In an additional or alternative example, micro optic 510 is utilized to provide chromatic control. That is, the processing elements of GPU 50 control the chromatic response of the light system by controlling the micro optic 510, allowing certain light bundles of light field 400 to pass or not within system 10. Low light situations provide an example of the need for chromatic control. In low light, one of the most difficult tasks is to extract Chroma information. In order to provide picture this situation, envision video taken at night, which tends to have Chroma noise. Generally, it is easier to darken images that have sufficient Chroma sampling (DR). The portions of the micro optic 20 can be utilized as described in other figures herein, for example. These portions can be used to expose each portion to appropriate levels of the well of each pixel. It should be understood that many variations of connection are possible based on the disclosure herein. Although features and elements are described above in particular combinations, each feature or element can be used alone without the other features and elements or in various combinations with or without other features and elements.

Figure 16:
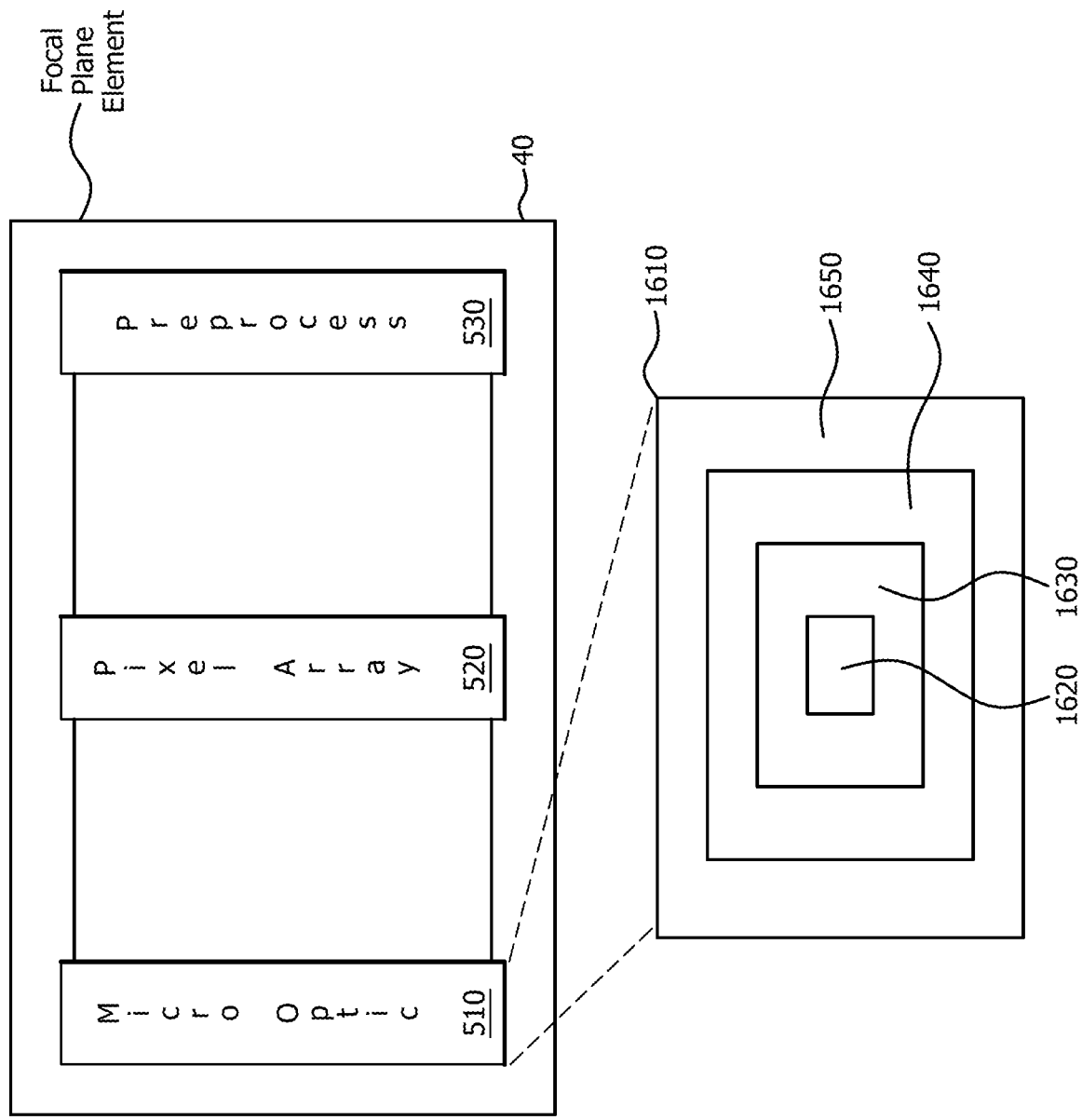
FIG. 16 illustrates an example system representing the micro optic that provides local modulating of light to handle HDR to enable downstream management of tone mapping.

FIG. 16 illustrates an example system 1600 representing the micro optic 510 that provides local modulating of light to handle HDR to enable downstream management of tone mapping. System 1600 is configured as described above with respect to at least FIG. 1 and FIGS. 5 and 6 and includes focal plane element 40 including micro optic 510, pixel array 520, and focal plane preprocess 530. GPU 50 from FIGS. 1, 5, 6 is not shown in system 1600, although GPU 50 controls micro optic 510, its configuration and provides feedback from focal plane 40 to achieve the desired effect provided by micro optic 510.

Generally, in performing HDR and local tone mapping in system 1600 where the sensor at focal plane 40 is responsible for capturing the image data, HDR information is extracted downstream to control the contrast locally which is called Local tone mapping (LTM). Normally this control is performed at the central level, so the sensor has to capture an image that is in most cases well beyond its natural or intrinsic capture capability. In the present configuration, the HDR and the local contrast are modulated at the light gathering part of system 1600 which is normally micro optic 510. By using local modulation of light, sensor 40 is able to capture the HDR information within its intrinsic dynamic range capacity. Once the light is modulated using the light bundles, the light bundles can be assigned to the respective locations in sensor 40. Because the light is modulated at micro optic 510, sensor 40 now views the object 20 in more or less the identical dynamic range as if it was seeing a non-HDR image.

By way of non-limiting example, micro optic 510 is divided into four concentric rectangular regions—an inner region 1620, an outer region 1650, a second outer region 1640 and a second inner region 1630. In an example, inner region 1620 is designed to attenuate the light bundle by a factor of 10, second inner region is designed to attenuate the light bundle by a factor of 5, second outer region 1640 is designed to attenuate by a factor of 2, and outer region 1650 is designed to provide zero attenuation. Other attenuation values and/or can be utilized. Other configurations for attenuation can also be utilized. Additional or fewer regions can also be utilized.

The resulting information at the sensor 40 is then processed sing preprocessor 530 with knowledge of the local modulations of light imparted at micro optic 510. In other words, at some location in the sensor, there is an assignment of a modulation gain of the optic 510 and that gain makes the HDR function. The values in the image at selected pixels are then processed to account for the imparted attenuation, while importantly properly exposing all portions of the sensor 40.

In another illustrative example, the amount of light on a pixel is controlled by controlling micro optic 510, such as being configured to transmit 50% of the light bundle. The sensor captures the light with the processing accounting for the knowledge that only 50% of the light was transmitted. The regular facilities of the detector are used to capture the light using, for example, say 80% of the pixel well, but system 1600 knows that a multiplication of the amount of light collected times the amount transmitted needs be imparted, for example.

This example demonstrates the use of local areas of contrast in high dynamic range scenes, for example, if there are back lit scenes in the snow or other similar features, this technique provides a way to extract the contrast but not destroy the total dynamic range and total contrast of the scene. By using this optical path throttling, both the high dynamic range capture and the local contrast management are controlled.

Further, system 1600 in this example can be used to decrease a single pixel by a factor of two and then throttle a different pixel by a factor of three. Knowing these throttle factors allows adjustment by the processor of the value of each pixel, and also for extrapolation to other pixels within the image and around the identified pixels. Local tone mapping can be performed because the information is captured instead of saturating out that pixel or having so little information causing increased noise or doing other techniques where the local tone mapping is lost. In essence, this represents feathering.

Figure 17:
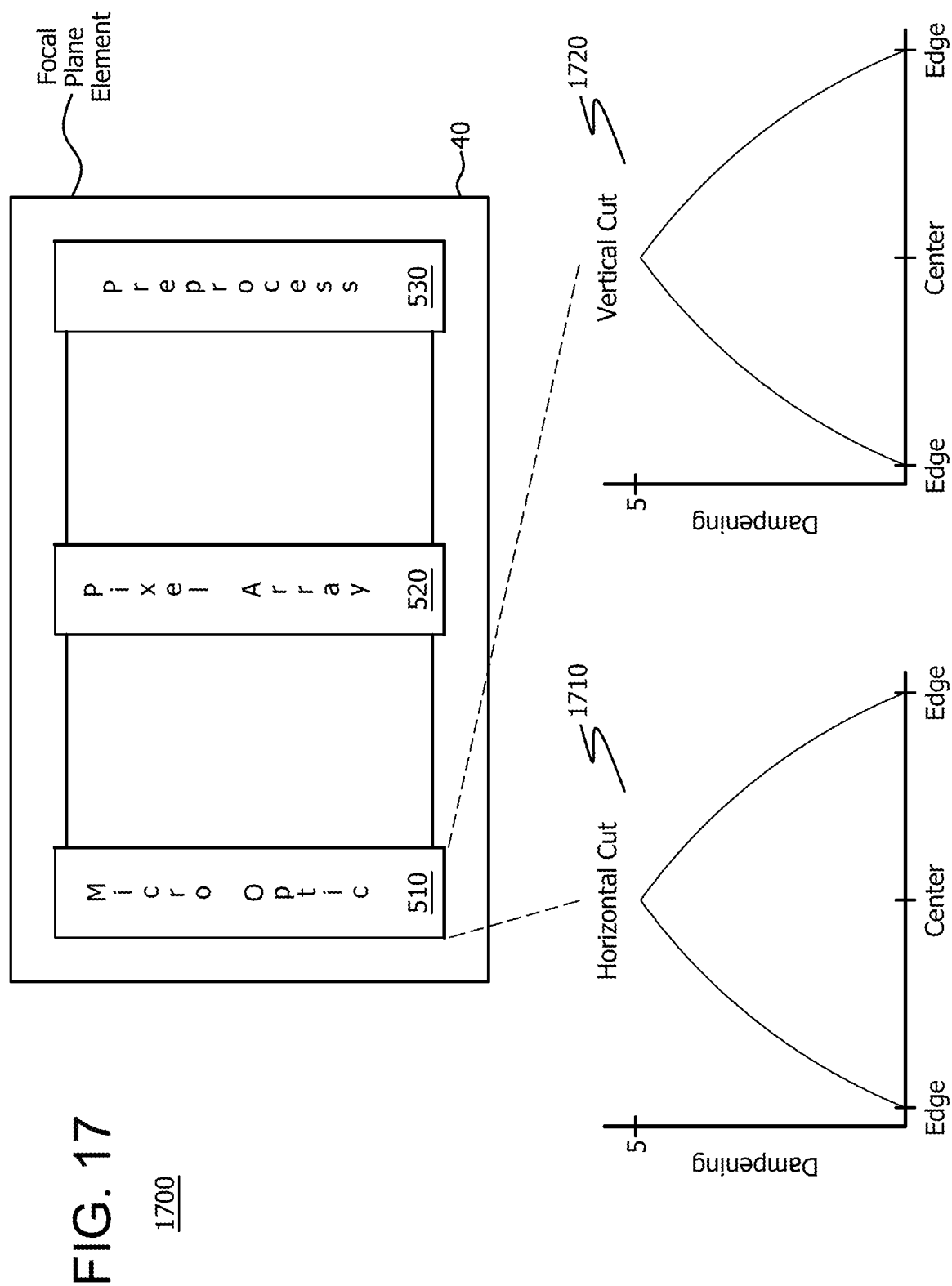
FIG. 17 illustrates an example system representing the micro optic that provides noise management control under conditions where the gain of the optics is not constant across the field of view.

FIG. 17 illustrates an example system 1700 representing the micro optic 510 that provides noise management control under conditions where the gain of the optics is not constant across the field of view. System 1700 is configured as described above with respect to at least FIG. 1 and FIGS. 5 and 6 and includes focal plane element 40 including micro optic 510, pixel array 520, and focal plane preprocess 530. GPU 50 from FIGS. 1, 5, 6 is not shown in system 1700, although GPU 50 controls micro optic 510, its configuration and provides feedback from focal plane 40 to achieve the desired effect provided by micro optic 510.

Micro optic 510 is configured to account for the noise that exists in the center of the image. For example, there is one value if noise exists and the pixel at the edge of the image was reduced in value by virtue of vignetting, for example. This pixel at the edge has a different noise value and trying to adjust and manage the noise across the field is quite difficult when the vignetting effect is present. Maintaining a consistent noise management across the field of view under such conditions is difficult.

In a similar way, lateral chromatic aberration presents with similar issues. The noise of chromatic aberration correction becomes more acute when progressing from the center, the axial center, of the image to the edge of the image, and so the modulation technique illustrated in FIG. 17 essentially makes the lens appear very flat and minimizes the vignetting and axial lateral chromatic aberration.

As illustrated in FIG. 17, micro optic 510 is controlled by GPU 50 to dampen the light bundle in the center. By way of example, the curve 1710 depicts the dampening curve as shown in a horizontal cut through micro optic 510. Curve 1720 depicts the dampening curve as shown in a vertical cut through micro optic 510. These two curves (horizontal 1710, vertical 1720) are shown as being identical, although any variation between the curves could be utilized. Similarly, while each curve is symmetric about the center of the micro optic 510, other non-symmetrical configurations can be utilized.

In this depiction, the dampening factor applied at the center of micro optic 510 is 5, while the dampening factor is applied as a parabolic curve that decreases from the center to the edge. The edge includes no dampening.

Figure 18:
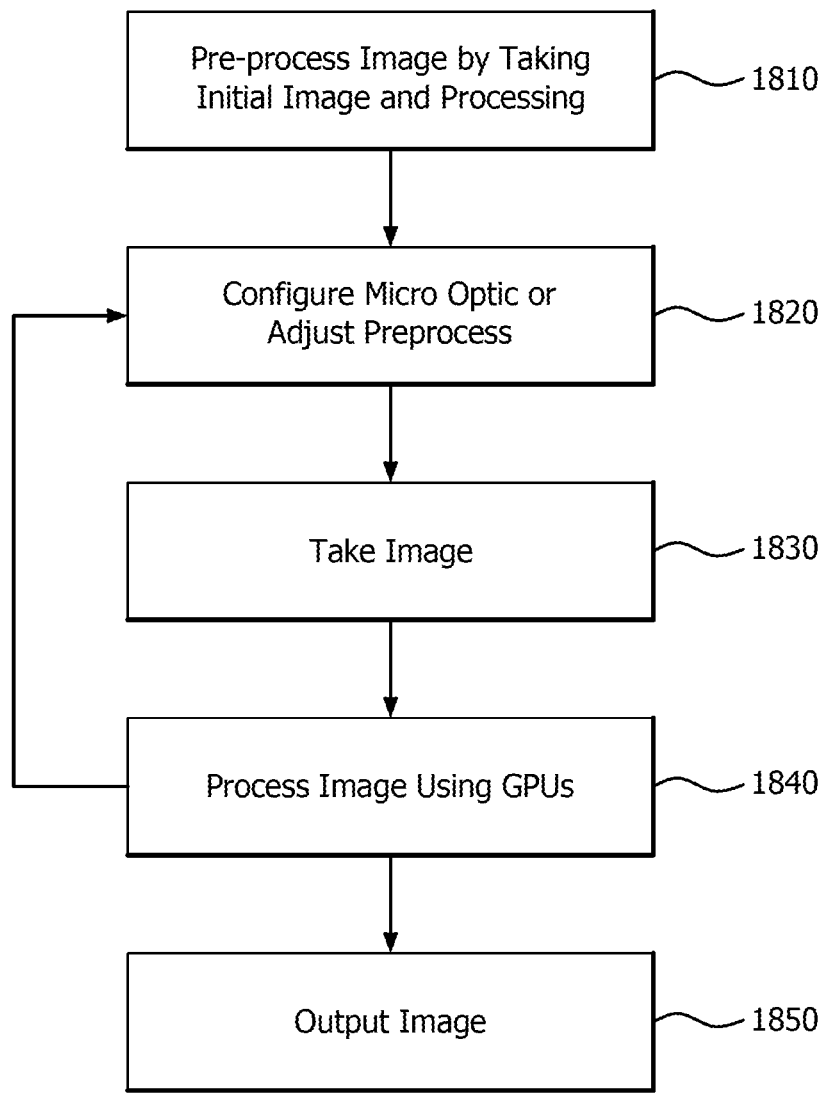
FIG. 18 illustrates a method performed within the system of FIG. 1 for controlling characteristics of collected image data.

FIG. 18 illustrates a method 1800 performed within the system of FIG. 1 for controlling characteristics of collected image data. Method 1800 includes preforming pre-processing at step 1810 by taking at least one initial image and processing the image using the GPUs. This initial image can be a sub-image or partial image allowing less data reduction. At step 1820, the micro optic is configured or the preprocess adjusted according to the processing of step 1810. The configuring of the optic can conform to any number of techniques of manipulating the light bundles, as described herein above, and can be designed to provide benefit to improve aberrations, signal-to-noise, and dynamic range, by non-limiting example only. At step 1830, the desired image can be taken. Once taken, the image is processed using the GPUs, either by assigning a GPU to each light bundle or by using GPU processing techniques to assign available GPUs to the light bundle as necessary. Once processed, a loop to configure the optic at step 1820 is formed. Such a loop provides the ability to provide additional configuration and can be used in case the pre-processing at step 1810 did not produce adequate results. Once the processed image is reduced and the desired effects removed, the image is output at step 1850.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for controlling characteristics of collected image data, the method comprising:
    performing pre-processing of an initial image using a graphics processing unit (GPU) by selecting regions of interest in the initial image by binning a plurality of red pixels in a first bin, binning a plurality of blue pixels in a second bin and binning a plurality of green pixels in a third bin;
    configuring an optic based on the pre-processing to modify an optical path length to account for at least one feature of the pre-processed initial image;
    acquiring another image using the configured optic;
    processing the acquired another image using the GPU;
    determining if the processed acquired another image accounts for the at least one feature of the pre-processed image;
    outputting the acquired another image when the determination is affirmative; and
    repeating the configuring of the optic and re-acquiring a subsequent image when the determination is negative.

2. The method of claim 1 wherein the pre-processing includes taking at least one image.

3. The method of claim 2 wherein the initial image is a sub-image.

4. The method of claim 1 wherein configuring an optic includes altering a micro optic to control the output at a sensor.

5. The method of claim 1 wherein the feature is high dynamic range (HDR).

6. The method of claim 1 wherein the feature is multiple depth of field (DOF) capture.

7. The method of claim 1 wherein the feature is a shutter mechanism for light bundles.

8. The method of claim 7 wherein the light bundle corresponds to an area in the focal plane.

9. The method of claim 1 wherein the feature is aperture control.

10. The method of claim 1 wherein the feature allows cropping of the image to reduce data collection resources.

11. The method of claim 10 wherein the resources include storage, bandwidth, or processing power.

12. The method of claim 1 wherein the feature is a bright object in the field of view.

13. The method of claim 1 wherein the feature is low light levels in the image.

14. The method of claim 1 wherein configuring an optic includes varying the preprocessing of the image to control the output at a sensor.

15. The method of claim 14 wherein the preprocessing includes additional binning.

16. The method of claim 15 wherein the additional binning operates to provide at least one of region of interest (ROI) selective binning, local aperture control or dynamic range control.

17. The method of claim 14 wherein the preprocessing includes decimating.

18. The method of claim 14 wherein the preprocessing includes filtering.

19. The method of claim 14 wherein the preprocessing includes cropping.

20. A device for controlling characteristics of collected image data, the device comprising:
    a plurality of graphic processing units (GPUs) coupled to an image collection device for performing pre-processing of an initial image by selecting regions of interest in the initial image by binning a plurality of red pixels in a first bin, binning a plurality of blue pixels in a second bin and binning a plurality of green pixels in a third bin;
    the plurality of GPUs configuring an optic or preprocessor based on the pre-processing, the configuring being designed to modify an optical path length to account for at least one feature of the pre-processed initial image;
    acquiring another image using the configured optic via the image collection device;
    the plurality of GPUs processing the acquired another image to determine if the processed acquired image accounts for the at least one feature of the pre-processed image, outputting the acquired another image when the determination is affirmative, and repeating the configuring of the optic and re-acquiring a subsequent image when the determination is negative.

* * * * *